(12) United States Patent
Chen et al.

(10) Patent No.: US 8,295,044 B2
(45) Date of Patent: Oct. 23, 2012

(54) STORAGE DEVICE ASSEMBLY

(75) Inventors: Yun-Lung Chen, New Taipei (TW); Da-Long Sun, Shenzhen (CN); Pei-Bin Luo, Shenzhen (CN)

(73) Assignees: Hong Fu Jin Precision Industry (WuHan) Co., Ltd., Wuhan, Hubei Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/240,276

(22) Filed: Sep. 22, 2011

(65) Prior Publication Data

US 2012/0007480 A1  Jan. 12, 2012

Related U.S. Application Data

(62) Division of application No. 12/431,609, filed on Apr. 28, 2009, now Pat. No. 8,054,624.

(30) Foreign Application Priority Data

Jul. 3, 2008  (CN) ...................... 2008 2 0301434 U

(51) Int. Cl.
 *G06F 1/16* (2006.01)
 *A47B 81/00* (2006.01)
(52) U.S. Cl. ............... 361/685; 361/679.33; 312/223.1; 312/333; 248/309.1; 248/27.3; 248/224.8
(58) Field of Classification Search ............... 248/309.1, 248/917, 224.8; 312/223.1, 333; 361/679.33, 361/679.37, 685
 See application file for complete search history.

(56) References Cited

U.S. PATENT DOCUMENTS

| | | | |
|---|---|---|---|
| 6,343,009 B1 * | 1/2002 | Liu et al. | 361/679.31 |
| 6,980,429 B2 * | 12/2005 | Erickson et al. | 361/679.32 |
| 7,495,909 B1 * | 2/2009 | Chen et al. | 361/679.37 |
| 7,950,752 B2 * | 5/2011 | Lin | 312/333 |
| 8,054,624 B2 * | 11/2011 | Chen et al. | 361/679.37 |
| 8,083,197 B2 * | 12/2011 | Zhang et al. | 248/309.1 |
| 8,164,894 B2 * | 4/2012 | Sun | 361/679.33 |
| 2006/0002078 A1 * | 1/2006 | Jing | 361/685 |

* cited by examiner

*Primary Examiner* — Amy J. Sterling
(74) *Attorney, Agent, or Firm* — Altis Law Group, Inc.

(57) ABSTRACT

A storage device assembly includes a storage device, a bracket and a securing member. The storage device defines a first securing hole. The bracket includes a sidewall with an opening. The securing member is attached to an outside of the sidewall and includes an actuating end, a securing end, and a pivot portion formed between the actuating end and the securing end. The actuating end includes a ridge portion. The pivot portion is pivotally attached to the sidewall. The storage device abuts the actuating end of the securing member to force the securing end to pivot toward the sidewall and engage the first securing hole, and the actuating end extends through the opening and to be pressed by the storage device when located in the bracket.

16 Claims, 5 Drawing Sheets

STORAGE DEVICE ASSEMBLY

CROSS-REFERENCE TO RELATED APPLICATIONS

This application is a divisional of U.S. patent application Ser. No. 12/431,609, filed on Apr. 28, 2009, titled "MOUNTING APPARATUS FOR STORAGE DEVICE".

BACKGROUND

1. Technical Field

The present disclosure relates to mounting apparatuses, and particularly, to a storage device assembly of an electronic device.

2. Description of Related Art

A typical personal computer includes data storage devices such as a hard disk drive (HDD), a floppy disk drive, and a compact disc-read only memory (CD-ROM) drive. Conventionally, the data storage devices are attached to a chassis of a computer enclosure using screws. A tool such as a screwdriver is used to fasten the screws, and to unfasten the screws when removing the data storage devices. Such operations are laborious and time-consuming. Furthermore, unintentional accidents may occur during operations (i.e. operator dropping tools and screws). When this happens, other internal components of the computer are liable to be damaged.

Accordingly, what is needed is a mounting apparatus whereby storage devices can be more easily attached and removed from the electronic device enclosure.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION OF THE EMBODIMENTS

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
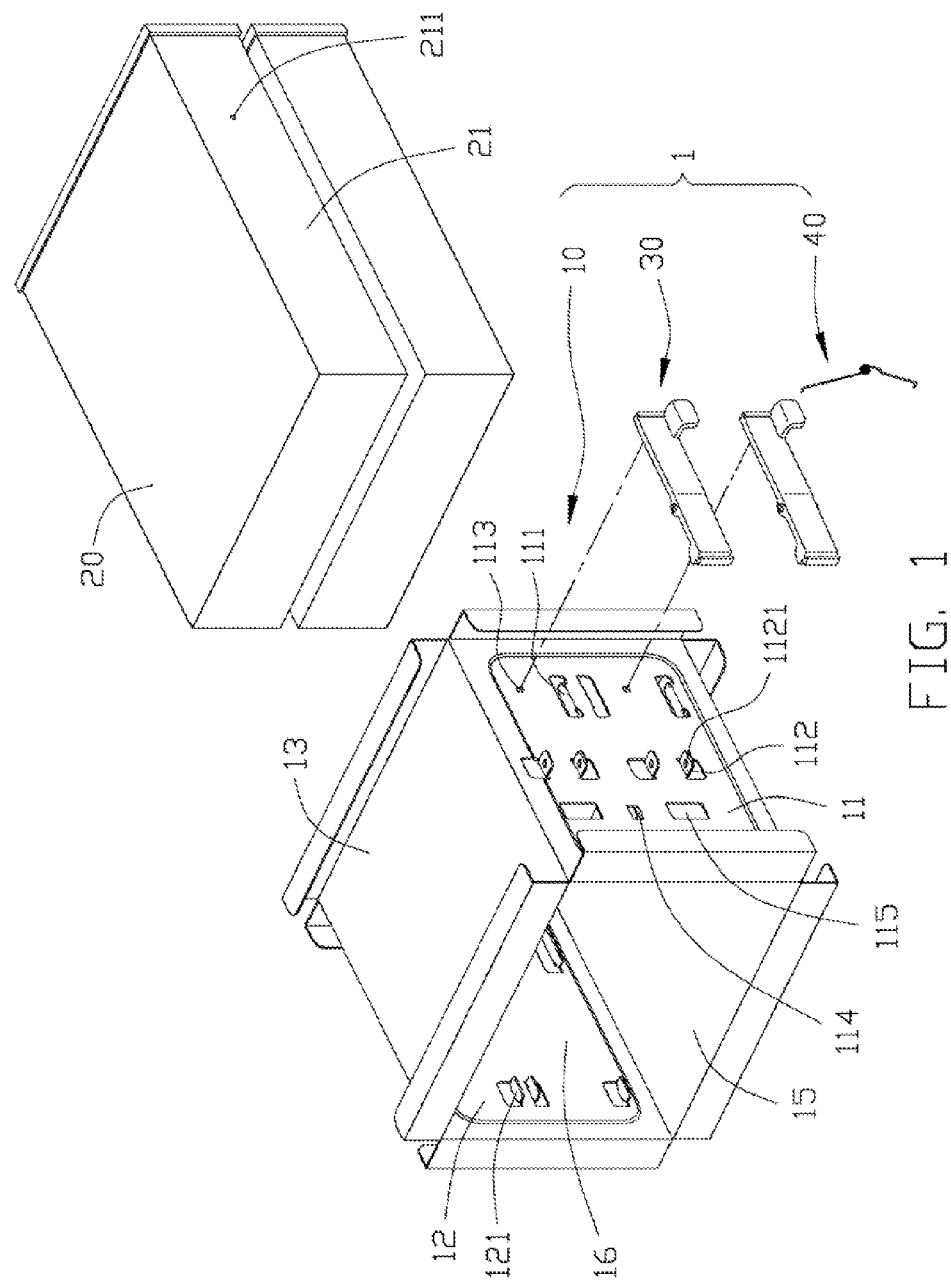
FIG. 1 is an exploded, isometric view of one embodiment of a mounting apparatus for storage devices of an electronic device and the storage devices.

Referring to FIG. 1, a storage device assembly in accordance with an exemplary embodiment includes a bracket 10, two storage devices 20 received in the bracket 10, two securing members 30 attached to one side of the bracket 10, and a spring member 40 connected to the bracket 10 and the securing members 30. A first securing hole 211 is defined in a sidewall 21 of each storage device 20.

The bracket 10 includes two opposite sidewalls 11 and 12, a top wall 13 and a bottom wall 15 perpendicular to the sidewalls 11 and 12. The sidewalls 11 and 12, the top wall 13 and the bottom wall 15 cooperatively define a receiving housing 16 configured to accommodate the storage devices 20. Two supporting tabs 111 vertically aligned with each other are defined on one side of the sidewall 11 and extend toward the receiving housing 16. Two second securing holes 113 corresponding to the first securing holes 211 in the storage devices 20 are defined in the sidewall 11 above the supporting tabs 111. Two openings 115 vertically aligned with each other are defined in the other side of the sidewall 11. A hook 114 is formed between the two openings 115. Two couples of pivot tabs 112 are also aligned in the vertical direction and disposed between the supporting tabs 111 and the openings 115. The couples of pivot tabs 112 extend out from the sidewall 11 of the bracket 10. Each pivot tab 112 defines a pivot hole 1121. A plurality of supporting tabs 121 are defined in the opposite sidewall 12 facing the sidewall 11. The supporting tabs 111 and 121 cooperatively support the storage devices 20.

Figure 2:
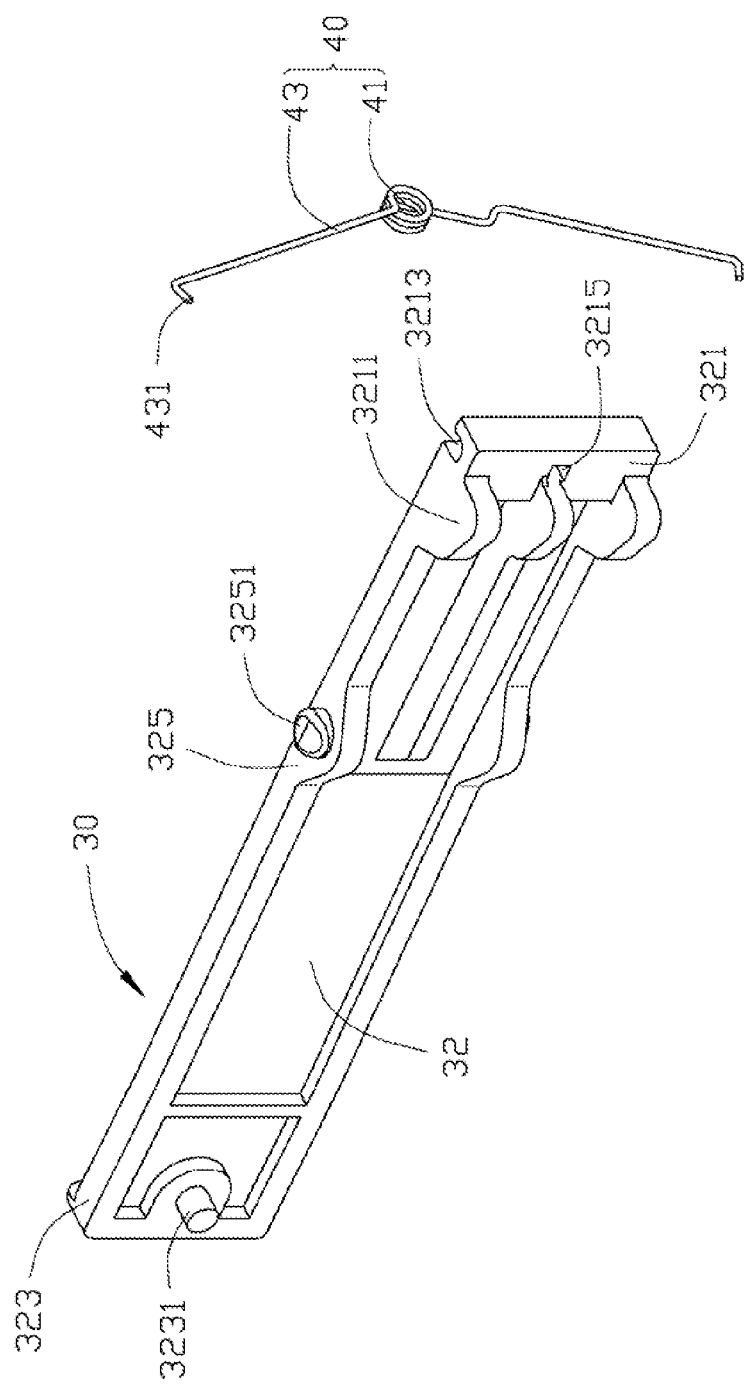
FIG. 2 is an isometric view of a securing member and spring member of FIG. 1.
Figure 3:
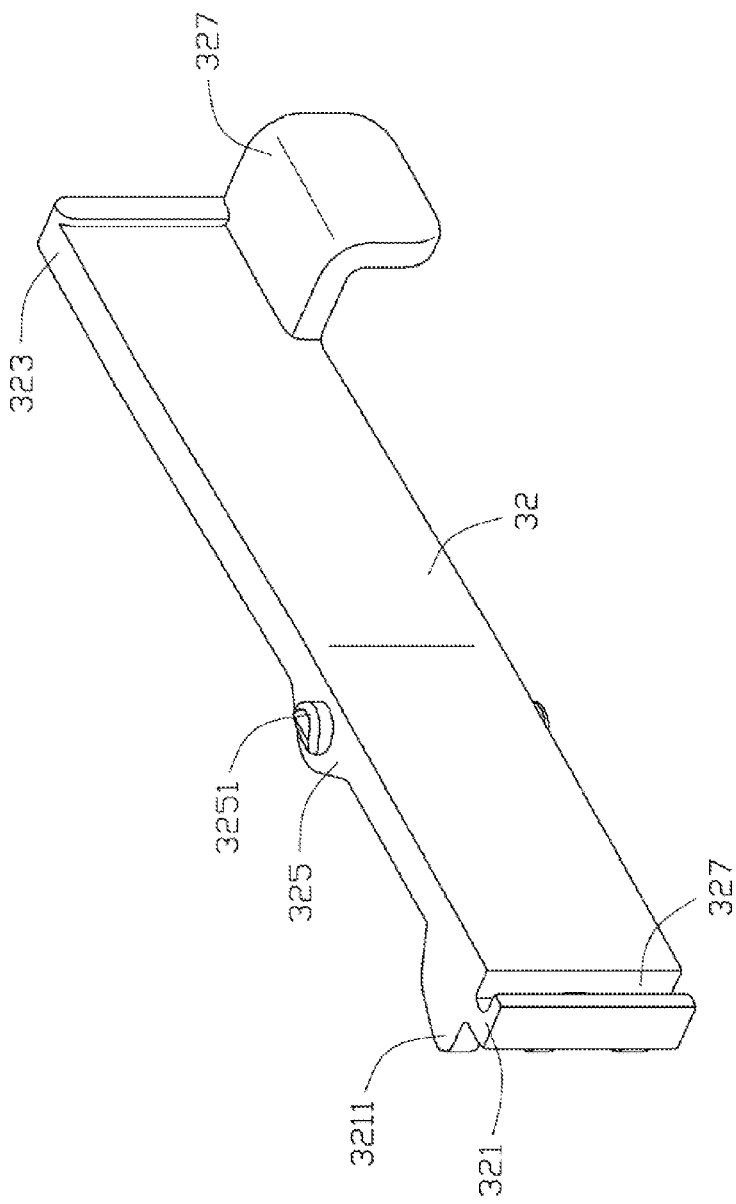
FIG. 3 is an isometric view of the securing member similar to FIG. 2, but viewed from another aspect.

Referring to FIGS. 2 and 3, the securing member 30 includes a rectangular base 32. The base 32 has an actuating end 321 and a securing end 323. A pivot portion 325 is formed on the base 32 between the actuating end 321 and the securing end 323. A ridge portion 3211 protrudes from one side of the actuating end 321. A receiving notch 3213 is defined in the other side of the actuating end 321. A securing slot 3215 communicated with the receiving notch 3213 is defined in the actuating end 321. Two pivoting posts 3251 respectively protrude from the upper and lower edges of the rectangular base 32 at the pivot portion 325. A securing post 3231 extends toward the sidewall 11 of the bracket 10 from the securing end 323 of the base 32. A handle tab 327 is bent down from an outside of the securing end 323 of each securing member.

The spring member 40 may be made of metal wire, and includes a coil portion 41 and two resilient arms 43 extending from two sides of the coil portion 41. The two resilient arms 43 are arranged at an angle more than 90 degrees relative to each other when the spring member 40 is at rest. An engaging portion 431 is bent from an end of each resilient arm 43.

Figure 4:
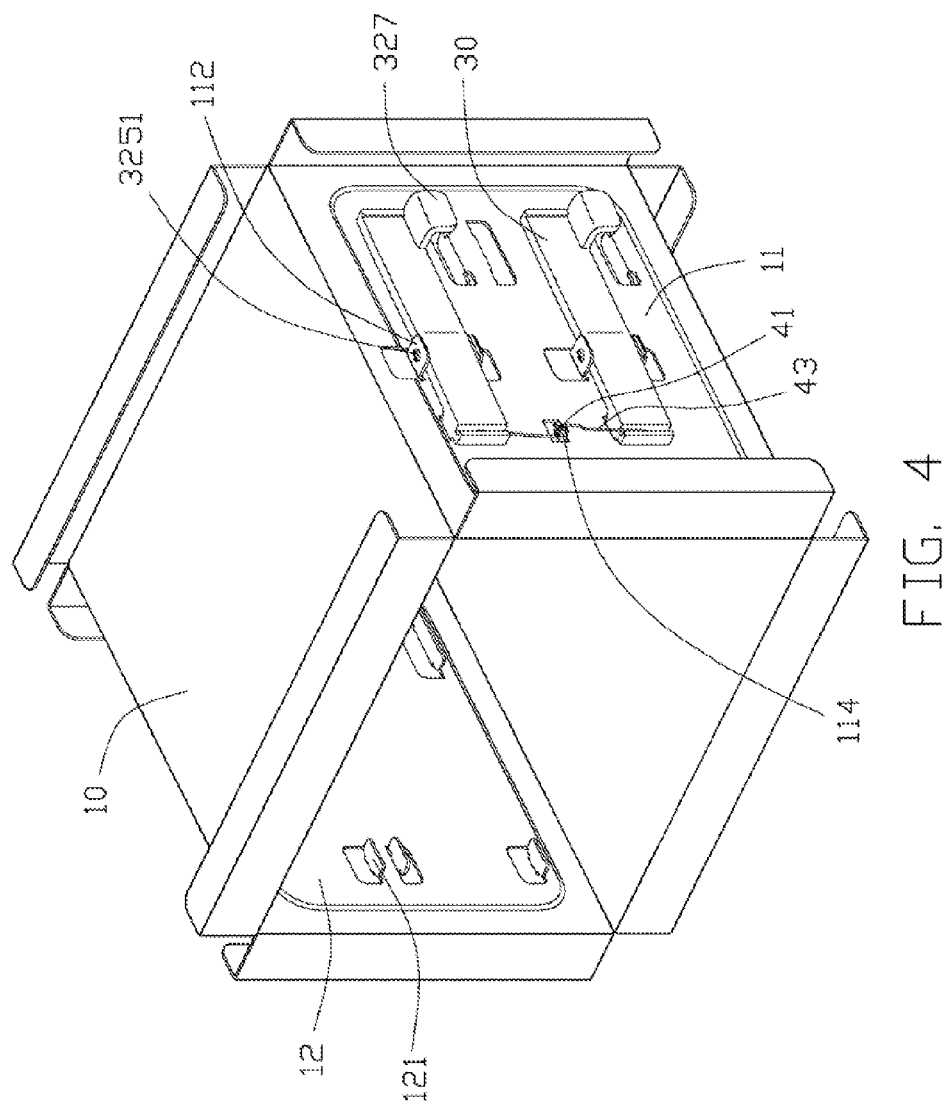
FIG. 4 is an assembled, isometric view of the mounting apparatus of FIG. 1.
Figure 5:
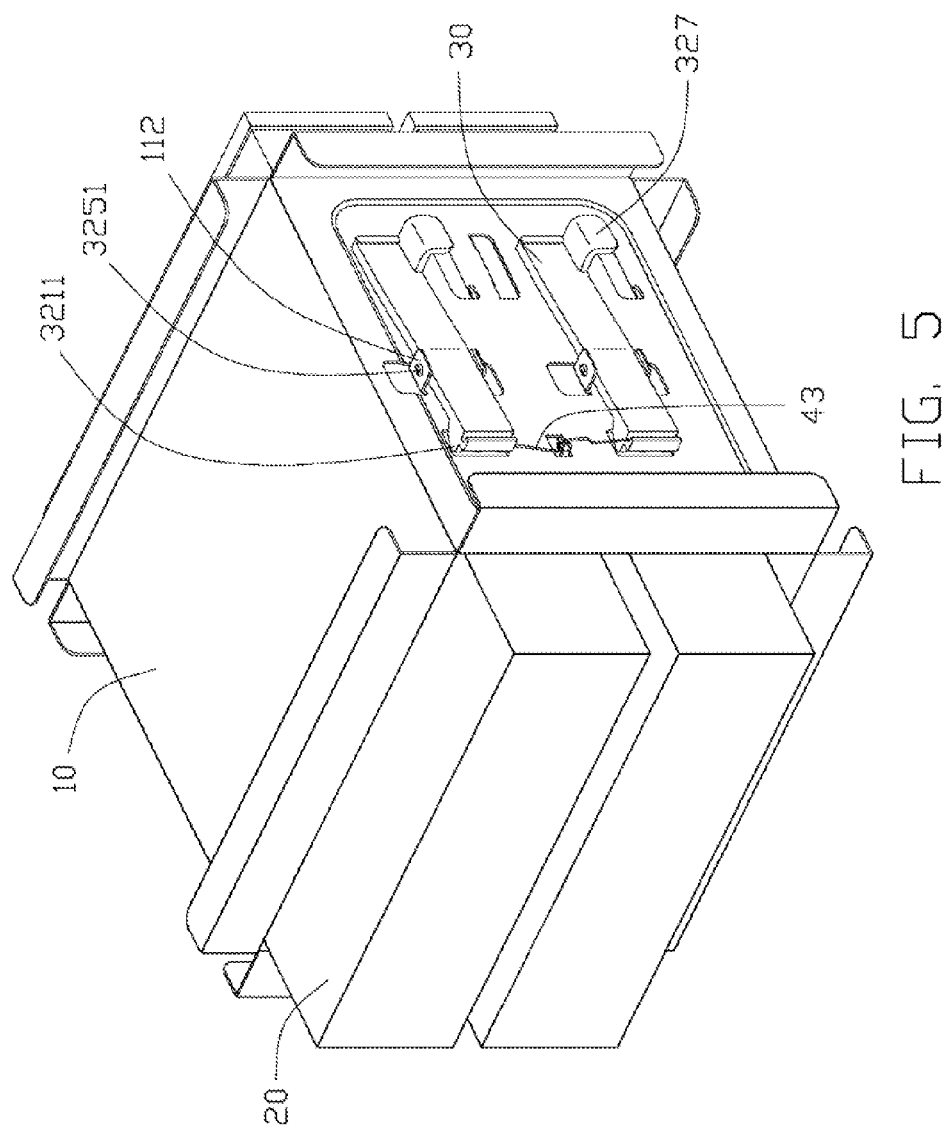
FIG. 5 is an assembled, isometric view of the mounting apparatus and storage devices of FIG. 1.

Referring to FIGS. 4 and 5, in assembly of the securing members 30 to the bracket 10, the pivoting posts 3251 of the securing members 30 are respectively engaged in the pivot holes 1121 of the corresponding couple of pivot tabs 112. The pivoting posts 3251 and the pivot holes 1121 cooperatively define a pivoting axis. The securing member 30 is capable of being rotated about the pivoting axis. The securing post 3231 of each securing member 30 is inserted into the corresponding second securing hole 113 of the sidewall 11 of the bracket 10. The ridge portions 3211 extend through the openings 115 in the sidewall 11. The coil portion 41 of the spring member 40 wraps around the hook 114 of the sidewall 11. The resilient arms 42 of the spring member 40 respectively abut on the receiving notches 3213 of the corresponding securing members 30. The coil portion 41 thus acts as a fulcrum for the resilient arms 42 deformation to drive the securing members 30. The two engaging portions 431 of the resilient arms 42 are respectively engaged in the securing slots 3215 of the securing members 30. Thereby, the securing members 30 are biased to abut the sidewall 11 of the bracket 10.

In mounting of the storage devices 20 in the bracket 10, the storage devices 20 are slid in the bracket 10 along the supporting tabs 111 and 121 of the bracket 10 and moved towards the ridge portions 3211. The sidewalls 21 of the storage devices 20 then abut against the ridge portions 3211 to drive the actuating ends 321 of the securing members 30 to move away from the sidewall 11 of the bracket 10. The securing members 30 are driven to pivot about the pivoting axis. The securing ends 323 of the securing members 30 are forced to move in so that the securing posts 3231 extend through the securing holes 113 of the sidewall 11. When the storage devices 20 move to a position where the securing holes 211 in the storage devices 20 are aligned with the securing holes 113, the securing posts 3231 of the securing members 30 are forced to engage in the first securing holes 211 of the storage devices 20. Thereby the storage devices 20 are secured to the bracket 10.

In disassembling of the storage devices 20 from the bracket 10, the handle tab 327 is pulled away from the sidewall 11 of the bracket 10. The securing posts 3231 are then disengaged from the securing holes 211 of the storage devices 20. The storage devices 20 can now be pulled out from the receiving housing 16. The sidewall 21 of the storage device 20 no longer abuts the ridge portions 3211 of the securing members 30. The resilient arms 43 of the spring member 40 rebound back and drive the ridge portions 3211 to retract into the openings 115 in the sidewall 11 of the bracket 10. Thus, the securing members 30 come back to the normal state ready for securing next storage devices.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A storage device assembly, comprising:
a storage device defining a first securing hole;
a bracket comprising a sidewall, the sidewall defining an opening;
a securing member, attached to an outside of the sidewall, comprising an actuating end, a securing end, and a pivot portion formed between the actuating end and the securing end; and the actuating end comprising a ridge portion, and the pivot portion pivotally attached to the sidewall; and
a spring member secured to the sidewall of the bracket, the spring member comprising two resilient arms biased against the securing member;
wherein the storage device abuts the actuating end of the securing member to force the securing end to pivot toward the sidewall and engage the first securing hole, and the actuating end extends through the opening to be located on an inside of the sidewall and to be pressed by the storage device when located in the bracket; the spring member is deformable and abuts the actuating end, the actuating end is engaged in the bracket through the sidewall, and the securing end is disengaged from the first securing hole.

2. The storage device assembly of claim 1, wherein a receiving notch is defined in the securing member and accommodates one of the two resilient arms.

3. The storage device assembly of claim 1, wherein a hook is formed adjacent to the opening, and the spring member comprises a coil portion engaged with the hook to provide a fulcrum for the two resilient arms.

4. The storage device assembly of claim 3, wherein the two resilient arms are arranged at an angle that is more than 90 degrees when the spring member is at rest.

5. The storage device assembly of claim 1, wherein a pair of pivot tabs, each defining a pivot hole, extends outwardly from the sidewall; a pivot post protrudes from the pivot portion of the securing member to pivotally engage the pivot hole.

6. The storage device assembly of claim 1, wherein two second securing holes are defined in the sidewall, a securing post protrudes from the securing end; wherein the securing post extends through one of the two second securing holes and is engaged with the first securing hole in the storage device.

7. The storage device assembly of claim 1, wherein a securing slot is defined in the actuating end.

8. The storage device assembly of claim 1, wherein a handle tab extends from the securing end.

9. A storage device assembly, comprising:
a storage device defining a first securing hole;
a bracket comprising a sidewall,
two securing members, attached to an outside of the sidewall, each securing member comprising an actuating end, a securing end, and a pivot portion located between the actuating end and the securing end pivotally attached to the sidewall; and
a spring member secured to the sidewall between the two securing members, the spring member abuts the actuating end;
wherein the securing member is rotatable around the pivot portion from a first position, where the actuating end is disengaged from the sidewall, the spring member is deformed, and the securing end is inserted into an inside of the sidewall and engaged into the first securing hole of the storage device; to a second position, where the actuating end is engaged with the sidewall, the spring member is released, and the securing end is disengaged from the first securing hole of the storage device.

10. The storage device assembly of claim 9, wherein the sidewall defining an opening, a ridge portion protrudes from the actuating end, and the ridge portion extends through the opening and abuts the storage device when located in the second position.

11. The storage device assembly of claim 10, wherein a hook is formed on the sidewall of the bracket, and the spring member comprises two resilient arms and a coil portion that is located on the hook to provide a fulcrum for the two resilient arms.

12. The storage device assembly of claim 11, wherein the two resilient arms are arranged at an angle to each other that is more than 90 degrees when the spring member is in the second position.

13. The storage device assembly of claim 12, wherein the two resilient arms bias the securing member.

14. The storage device assembly of claim 9, further comprising two pairs of pivot tabs, each defining a pivot hole, extending outwardly from the sidewall; and two pivot posts protrude from the pivot portion and pivotally engage one pair of the pivot holes.

15. The storage device assembly of claim 9, wherein a second securing hole is defined in the sidewall of the bracket, and a securing post protrudes from the securing end; wherein the securing post extends through the second securing hole and adapted to be engaged with the first securing hole in the storage device.

16. The storage device assembly of claim 9, wherein a handle tab extends from each securing end.

* * * * *